(12) United States Patent
Ishii

(10) Patent No.: US 8,106,943 B2
(45) Date of Patent: Jan. 31, 2012

(54) MICROSCOPE IMAGE PICKUP SYSTEM, MICROSCOPE IMAGE PICKUP METHOD AND RECORDING MEDIUM

(75) Inventor: Yasuko Ishii, Tama (JP)

(73) Assignee: Olympus Corporation, Tokyo (JP)

( * ) Notice: Subject to any disclaimer, the term of this patent is extended or adjusted under 35 U.S.C. 154(b) by 1184 days.

(21) Appl. No.: 11/890,860

(22) Filed: Aug. 7, 2007

(65) Prior Publication Data

US 2008/0055406 A1 Mar. 6, 2008

(30) Foreign Application Priority Data

Aug. 29, 2006 (JP) ................................. 2006-232300

(51) Int. Cl.
*H04N 7/18* (2006.01)
(52) U.S. Cl. .......... 348/79; 348/345; 348/152; 348/172; 348/135; 348/169; 359/363; 359/368; 359/372; 359/383; 359/388; 382/128; 369/4; 369/288
(58) Field of Classification Search .................... 348/79, 348/345, 152, 172, 135
See application file for complete search history.

(56) References Cited

U.S. PATENT DOCUMENTS

| 7,221,502 B2 * | 5/2007 | Terada et al. ................. 359/381 |
| 2005/0020876 A1 * | 1/2005 | Shioda et al. ................. 600/101 |

FOREIGN PATENT DOCUMENTS

| JP | 2001-211352 | 8/2001 |
| JP | 2001-223935 | 8/2001 |
| JP | 2002-031757 | 1/2002 |
| JP | 2002-185938 | 6/2002 |
| JP | 2002-267943 | 9/2002 |
| JP | 2003-185936 | 7/2003 |
| JP | 2005-316036 | 11/2005 |
| WO | WO 2004/036283 | 4/2004 |

OTHER PUBLICATIONS

Japanese Notice of Rejection Grounds, dated Oct. 18, 2011, issued in corresponding Japanese Patent Application No. 2006- 232300.

* cited by examiner

*Primary Examiner* — Jude Jean Gilles
(74) *Attorney, Agent, or Firm* — Kenyon & Kenyon LLP

(57) ABSTRACT

A microscope image pickup system is one having a microscope apparatus enabled to change an observation state by driving one or more optical members, which comprises: an image pickup unit for picking up an image of an observation object; an image process unit for applying an image process to an image picked up by the image pickup unit; an input unit for inputting a process factor of the image process unit, wherein an observation state of the microscope apparatus and/or an image pickup condition of the image pickup unit are set up and an image is picked up so as to pick up an image of an image quality being equal to, or better than, that of an image to which an image process is applied on the basis of the process factor input from the input unit.

20 Claims, 9 Drawing Sheets

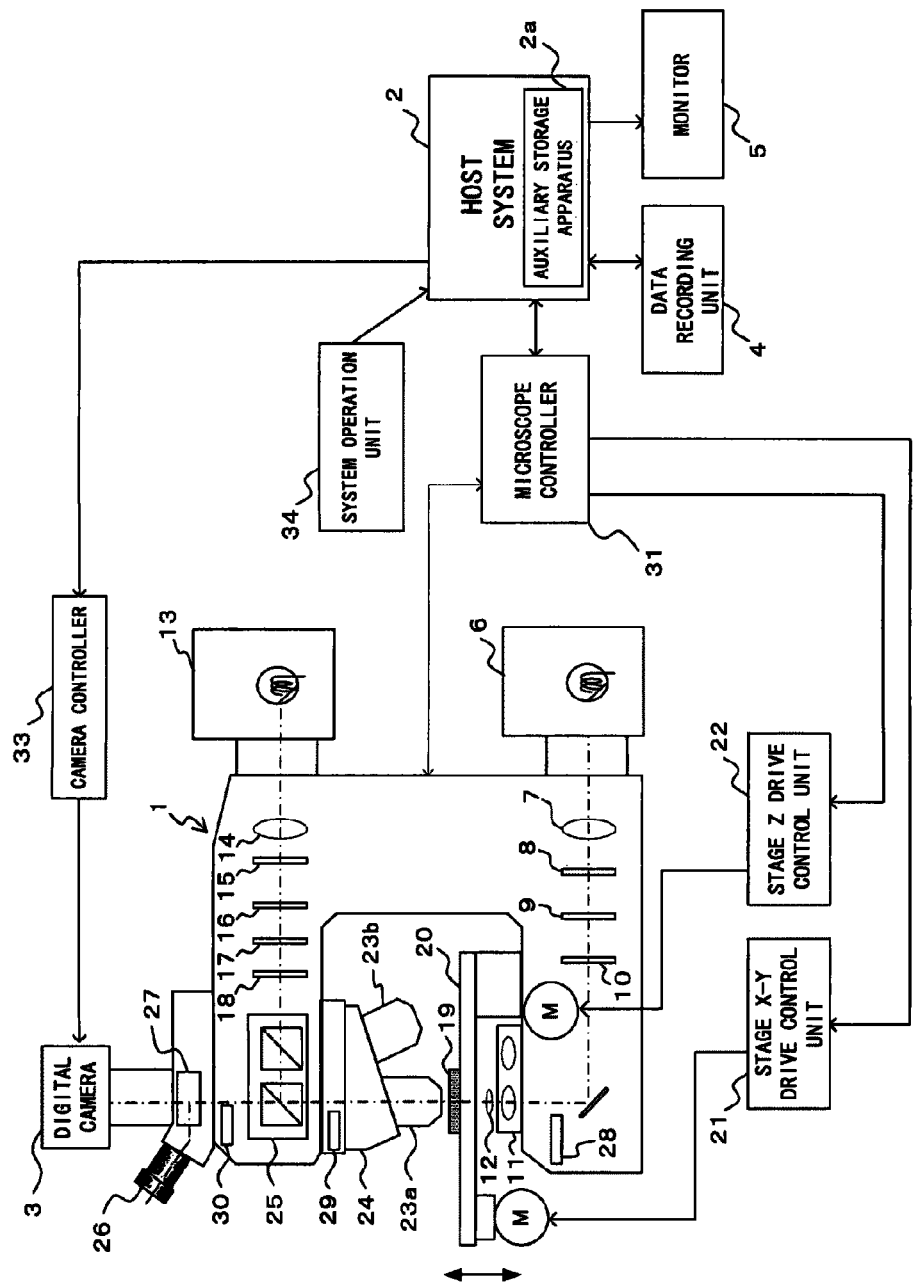
F I G. 1

US 8,106,943 B2

MICROSCOPE IMAGE PICKUP SYSTEM, MICROSCOPE IMAGE PICKUP METHOD AND RECORDING MEDIUM

CROSS REFERENCE TO RELATED APPLICATIONS

This application is based upon and claims the benefit of priority from the prior Japanese Patent Application No. 2006-232300, filed Aug. 29, 2006, the entire contents of which are incorporated herein by reference.

BACKGROUND OF THE INVENTION

1. Field of the Invention

The present invention relates to a microscope image pickup system comprising a microscope apparatus and an image pickup unit such as a digital camera.

2. Description of the Related Art

A microscope image pickup system requires the setup for driving various optical members of a microscope apparatus and image pickup condition of an image pickup unit when picking up an image of an observation body. Such a setup is different for each observer and picking up image and therefore requires a cumbersome adjustment.

In order to improve such a situation, a device has conventionally been conceived to enable an electrical control of a microscope apparatus and of an image pickup unit in a desired state by making it possible to record information related to the states of the microscope apparatus and image pickup unit in a removable recording medium and selecting the information related to a desired state from the recording medium. This makes it possible to record plural kinds of setups in a removable recording medium and therefore, if a certain operator records the information of the microscopic examination state in the recording medium, the state can be reproduced on the basis of the information recorded in the recording medium even if the examination state is changed by another operator.

Related to such a system, a reference patent document 1 (i.e., Laid-Open Japanese Patent Application Publication No. 2002-031757) has proposed a microscope system connecting a remotely operable microscope apparatus with an image processing-capable computer apparatus, thereby enabling various settings output therefrom to be reflected to a setup of the microscope apparatus. The microscope system is configured to make a camera side capable of recognizing a state of the microscope apparatus by an electrical connection, thereby enabling a recording of information such as a state of the microscope apparatus and an image pickup condition of the camera together with the picked-up image. And a later use of the information enables an operator to put the pickup image in order, set the microscope apparatus, and such. This configuration enables an operator to easily, restore the same observation state of the microscope apparatus and image pickup condition of the camera as those at the time of picking up the image just by selecting the image picked up beforehand, and thus making it possible to put the picked-up images in order and set the microscope apparatus, both in good operability.

Meanwhile, a reference patent document 2 (i.e., Laid-Open Japanese Patent Application Publication No. 2002-267943) has put forth a microscope image pickup apparatus recording the image pickup data of an electronic camera mounted onto a microscope together with a photographing condition related to the photographing, thereby enabling a reproduction of the state at the time of the photographing by reading the image pickup data.

SUMMARY OF THE INVENTION

A microscope image pickup system according to a first aspect of the present invention is one having a microscope apparatus enabled to change an observation state by driving one or more optical members, which comprises: an image pickup unit for picking up an image of an observation object; an image process unit for applying an image process to an image picked up by the image pickup unit; an input unit for inputting a process factor of the image process unit; a display unit for displaying an image to which an image process is applied by the image process unit based on the process factor input from the input unit; an observation state detection/setup unit for detecting and setting an observation state of the microscope apparatus; and an image pickup condition detection/setup unit for detecting and setting an image pickup condition of the image pickup unit, wherein an observation state of the microscope apparatus and/or an image pickup condition of the image pickup unit are set up and an image is picked up so as to pick up an image of an image quality being equal to, or better than, that of an image to which an image process is applied on the basis of the process factor input from the input unit.

A microscope image pickup method according to a second aspect of the present invention is one applied to a microscope image pickup system comprising: a microscope apparatus having a shutter unit for controlling an emission of an illumination light from a light source onto an observation specimen and comprising a drive unit capable of remotely operating each unit; an image pickup unit attached to the microscope apparatus; an image recording unit; an image display unit; an image process unit; an input unit for inputting a process factor of the image process unit; and a control unit connected to the microscope apparatus, wherein the process comprises opening the shutter unit and also pre-picking up image of the observation specimen at an initial setup, closing the shutter unit and also recording the pre-picked up image in the image recording unit, initiating an image process and also determining a process factor which is an image pickup condition for obtaining a desired image, while displaying a pre-picked up image in the image display unit, re-setting up the image pickup unit and microscope apparatus based on the determined process factor, opening the shutter unit and also properly picking up image of the observation specimen, and closing the shutter unit and also recording the properly picked-up image in the image recording unit.

A computer readable recording medium according to a third aspect of the present invention is one recording a control program for making a computer execute a microscope image pickup method applied to a microscope image pickup system comprising: a microscope apparatus having a shutter unit for controlling an emission of an illumination light from a light source onto an observation specimen and comprising a drive unit capable of remotely operating each unit; an image pickup unit attached to the microscope apparatus; an image recording unit; an image display unit; an image process unit; an input unit for inputting a process factor of the image process unit; and a control unit connected to the microscope apparatus, wherein the microscope image pickup process comprises opening the shutter unit and also pre-picking up image of the observation specimen at an initial setup, closing the shutter unit and also recording the pre-picked up image in the image recording unit, initiating an image process and also determining a process factor which is an image pickup condition for obtaining a desired image, while displaying a pre-picked up image in the image display unit, re-setting up the image pickup unit and microscope apparatus based on the determined process factor, opening the shutter unit and also properly picking up image of the observation specimen, and closing the shutter unit and also recording the properly picked-up image in the image recording unit.

BRIEF DESCRIPTION OF THE DRAWINGS

FIG. 1 is a diagram exemplifying a configuration of a microscope image pickup system according to a preferred embodiment 1;

DESCRIPTION OF THE PREFERRED EMBODIMENTS

Figure 2:
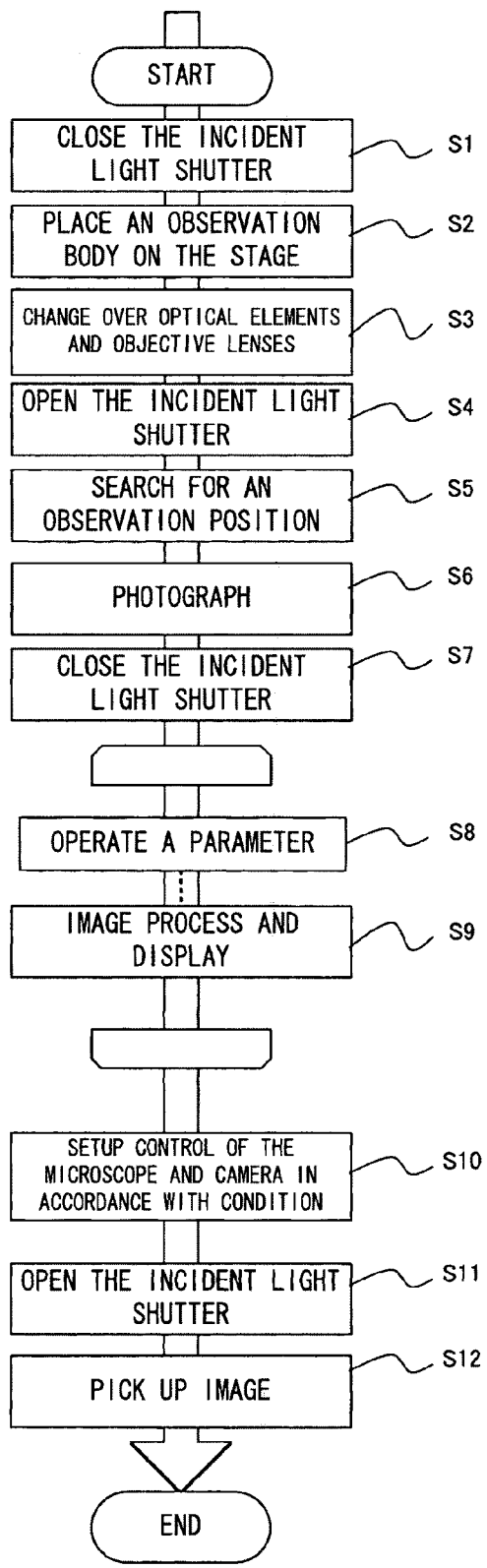
FIG. 2 is a flow chart exemplifying an image pickup operation at the time of observing under an incident fluorescent light by using a microscope image pickup system according to the embodiment 1.

The following is a description of the preferred embodiment of the present invention by referring to the accompanying drawings.

Embodiment 1

FIG. 1 is a diagram exemplifying a configuration of a microscope image pickup system according to the preferred embodiment 1 of the present invention.

A microscope apparatus 1 comprises, as a transmissive light observation optical system, a transmissive illumination light source 6, a collector lens 7 for collecting light of an illumination light of the transmissive illumination light source 6, a transmissive light filter unit 8, a transmissive light field stop 9, a transmissive light aperture stop 10, a condenser optical element unit 11 and a top lens unit 12 as shown in FIG. 1.

It also comprises, as an incident light observation optical system, an incident light illumination light source 13, a collector lens 14, incident light filter unit 15, incident light shutter 16, incident light field stop 17 and an incident light aperture stop 18. An motorized stage 20 which is movable in the up, down, left and right directions (i.e., the X, Y and Z directions) and on which an observation body (i.e., an observation specimen) 19 is placed in an observation light path in which the light path of the transmissive light observation optical system and that of the incident light observation optical system overlap with each other. The control for moving the motorized stage 20 is carried out at a stage X-Y drive control unit 21 and a stage Z drive control unit 22. Note that the motorized stage 20 comprises an origin detection function (not shown in a drawing herein) by means of an origin sensor, thereby enabling a coordinate detection, and a movement control by specifying a coordinate, of the observation body 19 placed on the motorized stage 20.

Also comprised in the observation path include a revolver 24 for selecting, by a revolving operation, an objective lens to be used for an observation from among plurally mounted objective lenses 23a, 23b and so on (generically noted as "objective lens 23" as appropriate hereinafter), a cube unit 25 for changing over microscopy (i.e., observation methods), and a beam splitter 27 for branching the observation light path into an eye piece lens 26 side and a digital camera 3 side. Further insertable into the observation light path include a polarizer 28, a differential interference contrast (DIC) prism 29, and an analyzer 30, for use in a differential interference observation. Note that each of these units is motorized so that the operation is controlled by a microscope controller 31 described later.

The microscope controller 31 connected to a host system 2 is configured to include the function of controlling an operation of the entirety of the microscope apparatus 1, having the functions of changing magnifications, changing microscopies and adjusting the light intensity of the transmissive illumination light source 6 and incident light illumination light source 13, and also sending, to the host system 2, the current microscopy state (i.e., the observation state) at the microscope apparatus 1. Meanwhile, the microscope controller 31 is also connected to the stage X-Y drive control unit 21 and stage Z drive control unit 22, enabling the host system 2 to control the motorized stage 20 as well. This configuration enables the microscope controller 31 to detect and set an observation state of the microscope apparatus 1 under the control of the host system 2.

A system operation unit 34 is a hand switch comprising various input units for inputting instructions for operating the microscope apparatus 1 and digital camera 3, likewise from the host system 2. The motorized stage 20 can also be operated by a joy stick or encoder (not described herein) likewise equipped in the system operation unit 34.

A microscope image of the observation body 19 picked up by the digital camera 3 is imported to the host system 2. The host system 2 is enabled to perform a turning On and Off of an automatic gain control, a gain setup, a turning On and Off of an automatic exposure control, an exposure time setup, and a binning setup, for the digital camera 3 by way of a camera controller 33. The camera controller 33 is configured to be enabled to detect and set an image pickup condition of the digital camera 3 under the control of the host system 2. The host system 2 is also enabled to store an image of the observation body 19 sent from the digital camera 3 as motion image data and still image data in a data recording unit 4. The motion image data and still image data recorded in the data recording unit 4 can be read by the host system 2 and displayed in a monitor 5 which is a display unit.

The host system 2 is further configured to provide a so-called video auto-focus (AF) function, that is, for performing a focusing operation based on the contrast of an image picked up by the digital camera 3. Note that the host system 2 is a computer of merely a standard configuration, comprising a central processing unit (CPU) for managing the operation control of the entirety of the microscope system through an execution of a control program, the main memory used for work memory by the CPU on an as required basis, an input unit (such as mouse and key board) for obtaining various instructions from the operator, an interface unit for managing an exchange of various data between individual constituent components of the microscope system and an auxiliary storage apparatus 2a, e.g., a hard disk apparatus, for storing various program and data. Note that the present embodiment is configured to share the input unit of the host system 2 with the system operation unit 34; it is, however, possible to equip these units separately.

The next is a description of an image pickup operation at the time of an incident light fluorescent observation in the microscope image pickup system according to the present embodiment by referring to FIGS. 2, 3A, 3B and 4. Note that the image pickup operation is carried out by the CPU of the host system 2 reading and executing a control program stored in the auxiliary storage apparatus 2a as noted above.

FIG. 2 is a flow chart exemplifying the image pickup operation.

The image pickup operation first closes the incident light shutter 16 (S1), sets the observation body 19 on the motorized stage 20 (S2), changes over various optical elements for performing an incident light fluorescent observation at the microscope apparatus 1 and also changes over to an objective lens 23a of a low magnification for searching for an observation position (S3) as shown in FIG. 2.

Then, the operation opens the incident light shutter 16 (S4), searches an observation object in the observation body 19 (S5), pre-picks up image of the observation object by setting the observation state of the microscope apparatus 1 and the image pickup condition of the digital camera 3 at an initial setting (S6) and closes the incident light shutter 16 (S7). Incidentally, the pre-picked up image (noted as "pre-pickup image" hereinafter) is stored in the data recording unit 4.

Then, in accordance with a parameter input by the operator (S8), the operating repeats the process (noted as "parameter adjustment process" hereinafter) for applying an image process to the pre-pickup image in S6 (S9) for each input of the parameter in order to adjust a parameter (i.e., a process factor) for picking up a desired image. Note that the incident light shutter 16 is closed to shut the light off the observation body 19 during the adjustment of the parameters for picking up a desired image and therefore there is no risk of damaging the observation body 19.

The process as follows is performed in the parameter adjustment process in more specific.

The process first initiates an image process and also displays a window having a graphical user interface (GUI) in the monitor 5.

Figure 3:
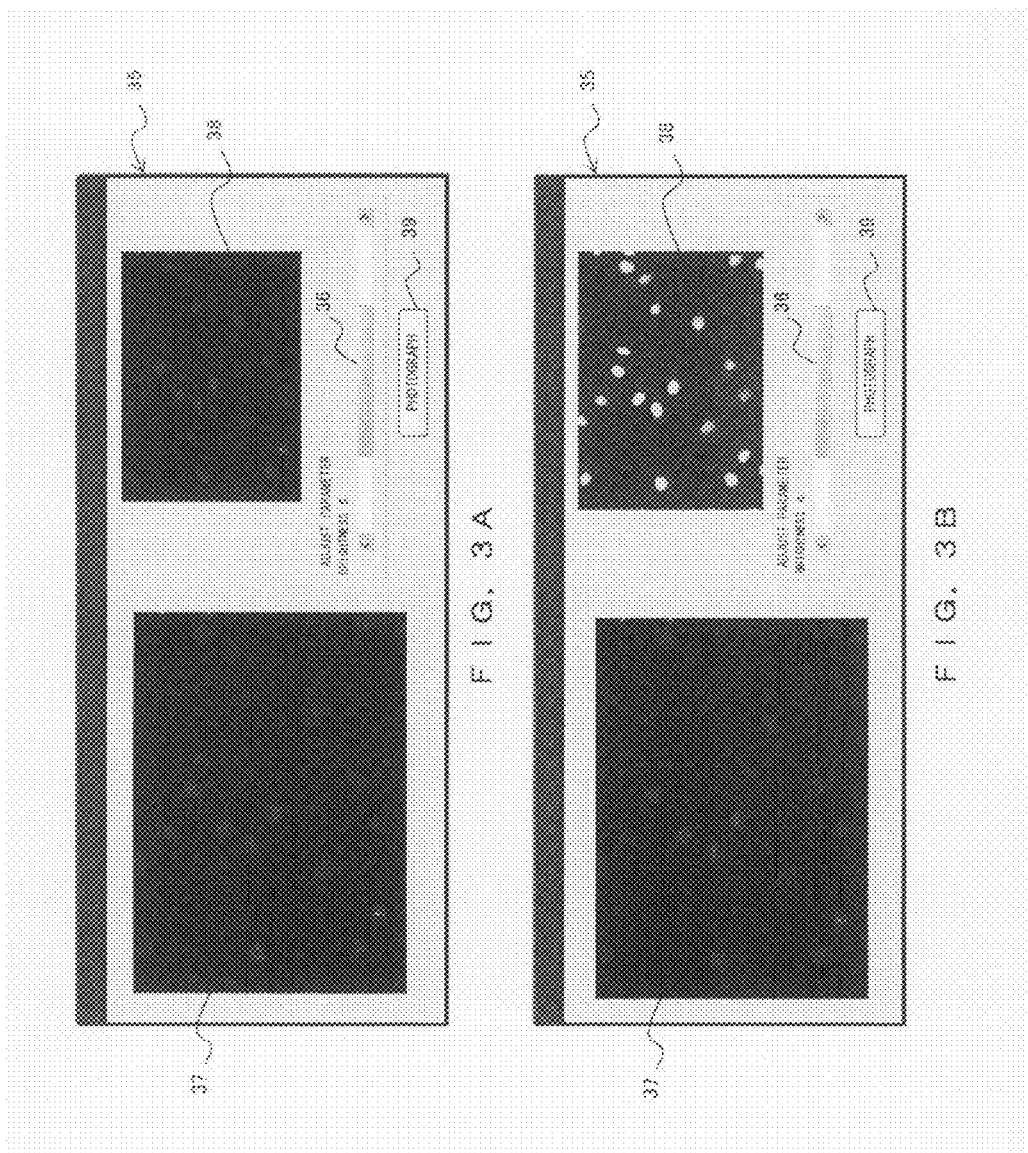
FIG. 3A is a first diagram exemplifying a window having a graphical user interface (GUI) function according to the embodiment 1.
FIG. 3B is a second diagram exemplifying a window having a graphical user interface (GUI) function according to the embodiment 1.

FIG. 3A is a first diagram exemplifying a window having a GUI function. The window 35 is furnished with a slider 36 for enabling an input of a brightness parameter, a pre-pickup image display column 37 for displaying a pre-pickup image, a simulated process image display column 38 for displaying an image of a result of the host system 2 applying an image process to the pre-pickup image based on a parameter of brightness corresponding to the current position of the slider 36, that is, an image of a result of reflecting the parameter of brightness to the pre-pickup image, and an photography button 39 for starting an image pickup by controlling the observation state of the microscope apparatus 1 and/or the image pickup condition of the digital camera 3 so as to pick up image of the same image quality as, or better than, that of the image displayed in the current simulated process image display column 38 as shown in FIG. 3A.

Note that, if the slider 36 is not operated after displaying the window 35 in the monitor 5, a pre-pickup image is also displayed in the simulated process image display column 38.

When such a window 35 is displayed in the monitor 5, a brightness parameter is input by the operator moving the slider 36 by using a mouse or such so that the image displayed in the simulated process image display column 38 becomes an image of a desired brightness (S8).

When the slider 36 is moved, an image of a result of the host system 2 applying an image process to the pre-pickup image based on a parameter of the brightness in accordance with the post-movement position of the slider 36 is displayed in the simulated process image display column 38 (S9).

As shown in FIG. 3B for example, when a parameter of a brightness of "4" is input by moving the slider 36, an image of a result of applying an image process to the pre-pickup image based on the parameter of "4" is displayed in the simulated process image display column 38.

As such, the processes of the steps S8 and S9 are repeated as appropriate, and a parameter (i.e., a parameter of a brightness herein) for exploring an observation state of the microscope apparatus 1 and/or image pickup condition of the digital camera 3 is adjusted while the simulated process image display column 38 is confirmed by the operator in the parameter adjustment process so as to pick up a desired image.

Incidentally, for the image process in the example described by referring to FIGS. 3A and 3B, if a brightness is "n" times a signal S of the pre-pickup image displayed in the pre-pickup image display column 37, a signal Si of an image displayed in the simulated process image display column 38 is Si=n*S. If the characteristic of an illumination is not linear, however, it may be calculated by using characteristic data of the illumination. Alternatively, a microscope apparatus for which the characteristic of an illumination is so optically designed as to be linear may be applied as the microscope apparatus 1.

Then, when the photography button 39 is pressed by using a mouse or such at the time of a desired image being displayed in the simulated process image display column 38 as a result of the operator adjusting the parameter for picking up a desired image as described above, what is entailed here is a control being performed for re-setting the observation state of the microscope apparatus 1 and/or the image pickup condition of the digital camera 3 based on the input current parameter (i.e., the determined parameter) so as to pick up an image of the same image quality as, or better than, that of the image being displayed in the simulated process image display column 38 (S10). As an example, a light volume of the incident light illumination light source 13 that is a control item of the microscope apparatus 1 is set by the host system 2 by way of the microscope controller 31.

The completion of the step S10 is followed by opening the incident light shutter 16 (S11), properly picking up an image (S12), closing the incident light shutter 16 and thus ending the image pickup operation according to the present flow. Incidentally, the properly picked-up image in the S12 is recorded in the data recording unit 4.

Figure 4:
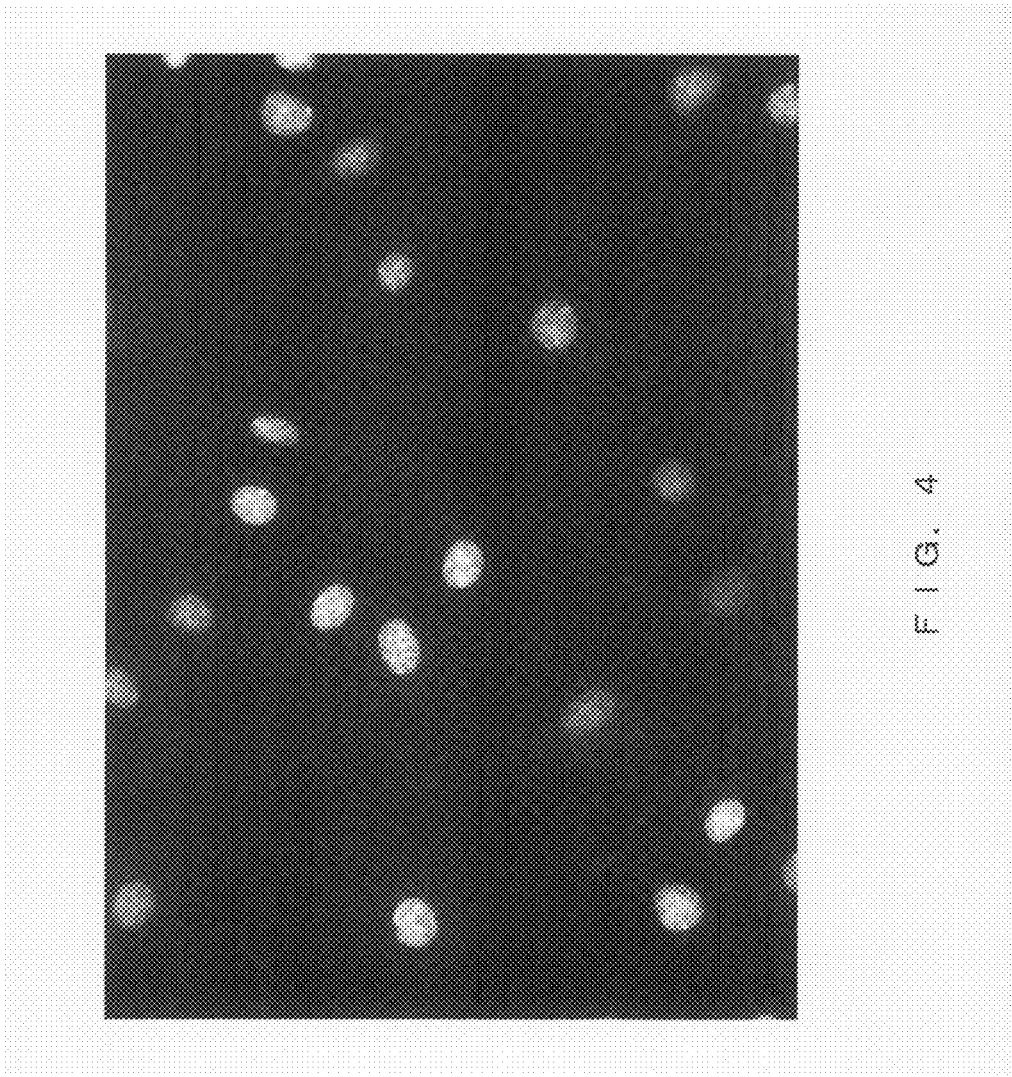
FIG. 4 is a diagram exemplifying an image properly picked up in S12 of FIG. 2.

FIG. 4 is a diagram exemplifying an image properly picked up in S12.

As described above, the image displayed in the simulated process image display column 38 is generated by the image process and therefore the properly picked-up image is an image of the same quality as, or better than, that of the image generated by the image process.

As such, the microscope image pickup system according to the present embodiment is configured to enable a display of an image by means of an image process applied to the pre-pickup image as if it were one picked up by controlling the microscope image pickup system. It is also configured to pick up an image by controlling a setup of the microscope image pickup system based on the parameter used for the image process, thereby making it possible to obtain an image of the same image quality as, or better than, that of the image-processed image. It is further configured to enable the operator to perform an adjustment of a parameter, that is, the adjustment of the observation state of the microscope apparatus 1 and/or that of the image pickup condition of the digital camera 3, for picking up a desired image without emitting an illumination light on the observation body 19.

Note that the present embodiment has been described by exemplifying a parameter of brightness; it is applicable to other parameters pertaining to the control items of the microscope apparatus 1 and digital camera 3. As an example, it is possible to apply to the parameter of the motorized stage 20 (i.e., the position thereof) aperture stop (AS), exposure time, gain, magnification, binning, objective lens 23, cube unit 25, light source voltage, ISO sensitivity, color temperature or optical filter.

Also, the present embodiment has been described for the process of using one kind of parameter, that is, the parameter of the brightness, it is possible to perform a process of using plural kinds of parameters such as an exposure time and gain, or the like, for example.

At this point, the description is on an example of performing a process using plural kinds of parameters.

Figure 5:
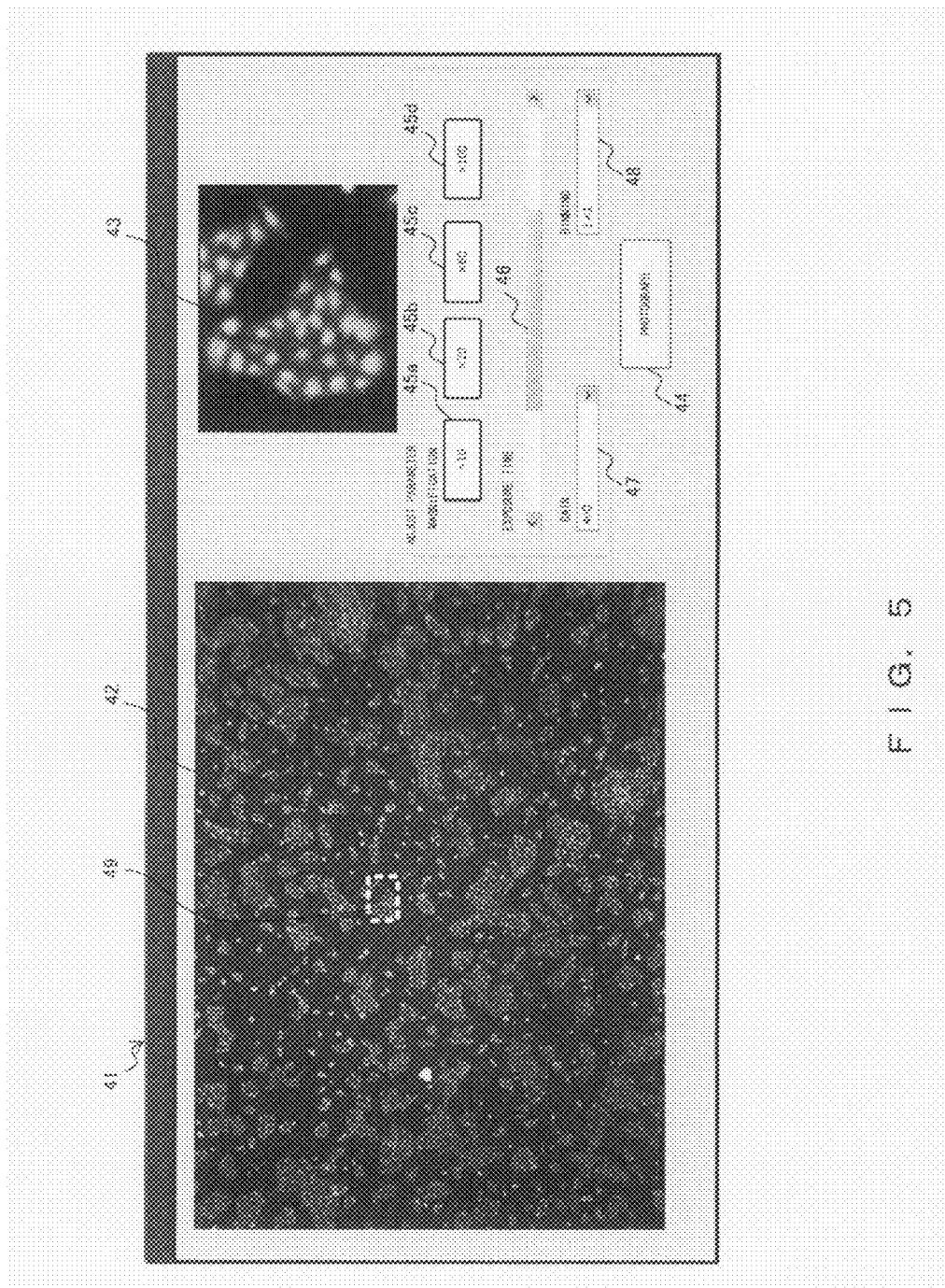
FIG. 5 is a diagram exemplifying a window having a GUI function in which plural kinds of parameters are adjustable.

FIG. 5 is a diagram exemplifying a window having a GUI function in which plural kinds of parameters are adjustable. The window 41 is configured to enable the adjustments of plural kinds of parameters such as a magnification, stage coordinates (i.e., X Y coordinates) exposure time, gain and binning, as shown in FIG. 5.

Likewise the window 35 shown in FIGS. 3A and 3B, the window 41 is furnished with a pre-pickup image display column 42 for displaying a pre-pickup image, a simulated process image display column 43 for displaying an image of a result of the host system 2 applying an image process to the pre-pickup image based on an input parameter, that is, the image of a result of reflecting the input parameter to the pre-pickup image, and a photography button 44 for starting an image pickup by controlling a setup of the observation state of the microscope apparatus 1 and/or that of the image pickup condition of the digital camera 3 so as to pick up an image of the same image quality as, or better than, that of the image displayed in the simulated process image display column 43.

Also furnished as means for enabling a parameter input include buttons 45a, 45b, 45c and 45d (generically noted as "button 45" as appropriate hereinafter) for enabling a parameter input of a magnification, a slider 46 for enabling a parameter input of an exposure time, a pull-down menu 47 for enabling a parameter input of a gain and a pull-down menu 48 for enabling a parameter input of a binning.

When a magnification parameter is input by either of the buttons 45 being pressed in the window 41, a display range (noted as "simulated process image display area" hereinafter) 49 of the simulated process image display column 43 is displayed in the pre-pickup image displayed in the pre-pickup image display column 42, thereby making it possible to confirm as to which part of the pre-pickup image the image corresponds to. And the simulated process image display area 49 is configured to enable a movement in the pre-pickup image display column 42 by using a mouse or key board so as to display an image corresponding to a post-movement simulated process image display area 49 when moving the simulated process image display area 49.

When a parameter of a magnification of "×20" is input by the operator pressing the button 45b for example in such configured window 41, a simulated process image display area 49 corresponding to the parameter of the magnification is displayed in the pre-pickup image display column 42, and an image within the simulated process image display area 49 is displayed in the simulated process image display column 43. Then, when the operator inputs a parameter of an exposure time by operating the slider 46, that of a gain by the pull-down menu 47 and that of a binning by the pull-down menu 48, an image of a result of the host system 2 applying an image process to the pre-pickup image displayed in the pre-pickup image display column 42 based on the input parameter(s), that is, an image of a result of reflecting the input parameter (s), is displayed in the simulated process image display column 43. Note, however, that the image displayed in the simulated process image display column 43 is an image corresponding to a partial image within the simulated process image display area 49 of the pre-pickup image displayed in the pre-pickup image display column 42. And, when such a parameter is input by the operator, a desired image is displayed in the simulated process image display column 43 and the photography button 44 is pressed, a setup of the observation state of the microscope apparatus 1 and/or that of the image pickup condition of the digital camera 3 is controlled so as to pick up an image of the same image quality as, or better than, that of the image presently displayed in the simulated process image display column 43, and the image is picked up. That is, the host system 2 inserts the objective lens 23b of the ×20 (i.e., a 20-time magnification) into the light path, lowers the light volume of the incident light illumination light source 13, controls the gain, binning and exposure time and moves the motorized stage 20 via the stage X-Y drive control unit 21, all by way of the microscope controller 31 and camera controller 33 based on the presently input parameters, followed by carrying out an image pickup.

As described above, the window having a GUI function shown in FIG. 5 enables the adjustment of various plural parameters for picking up a desired image, that is, the adjustment of the observation state of the microscope apparatus 1 and/or that of the image pickup condition of the digital camera 3, without emitting a light onto the observation body 19.

Note that the window 41 having a GUI function shown in FIG. 5 is merely an example, and the form, layout and such are arbitrary. So is the window 35 shown in FIGS. 3A and 3B.

The next is a description on an image process carried out on the basis of a parameter input to the window 41.

In an image process performed on the basis of a magnification parameter, the image process is performed by using a linear interpolation process, or the like, which is used for a common image process for an image process for enlarging of reducing the magnification of an image.

As for an image process performed on the basis of parameters of an exposure time and gain, a thermal noise Ns and a transfer noise Nt are included, as noise, usually in a signal Sa of an image picked up by a digital camera 3. Therefore, the signal Sa is calculated by the following expression (1):

$$\text{Signal } Sa = \text{thermal noise } Ns + \text{transfer noise } Nt + \text{signal component } S \qquad (1)$$

These noise components are specific to a digital camera 3, with the thermal noise Ns increasing with exposure time and the transfer noise Nt being constant. Each noise is so random that it is difficult to predict, however. Therefore an average of noises is used. When using the average, a signal may show a minus value, in which case an average of neighboring signal values is used for an interpolation.

An expression for calculating a signal Sae in the case of changing exposures is represented by the following expression (2), where a magnification against an exposure time of the original image (i.e., the pre-pickup image) is n-time:

Signal $Sae$=thermal noise $n*Ns$+transfer noise $Nt$+signal component $n*S$ (2)

An expression for calculating a signal Sag in the case of changing gains is represented by the following expression (3), where a magnification against a gain of the original image (i.e., the pre-pickup image) is n-time:

Signal $Sag$=thermal noise $n*Ns$+transfer noise $n*Nt$+signal component $n*S$ (3)

If a gain is increased and/or an exposure time is elongated in the digital camera 3, a noise is increased and therefore a Gaussian noise and an impulse noise may be overlapped at the time of an image process. Alternatively, noise data is retained by the data recording unit 4 in advance, and it may be used at the time of carrying out an image process.

In an image process carried out on the basis of a binning parameter, the image process is carried out by a common binning process.

Meanwhile, if a parameter is that of an aperture stop (i.e., an incident light aperture stop 18) and that of a confocal observation changeover (i.e., the cube unit 25), an image process for emphasizing a high frequency component of a frequency distribution, for example, is to be merely carried out, and in the case of the confocal observation changeover, an image process is to be merely carried out by combining an un-sharp mask filter, an contrast/contour emphasis filter and such, although the descriptions for FIGS. 3A, 3B and 5 do not provide a detail.

Embodiment 2

A microscope image pickup system according to the embodiment 2 of the present invention is configured to enable an adjustment of a parameter more easily.

Note that the configuration of the microscope image pickup system according to the present embodiment is the same as that of the embodiment shown in FIG. 1. The operation of the present embodiment is the same as that of the embodiment 1, except for an operation related to the parameter adjustment process (i.e., the processes repeating the S8 and S9 as appropriate) in the image pickup operation shown in FIG. 2. The present embodiment is accordingly described in detail for the operation related to the different part.

Figure 6:
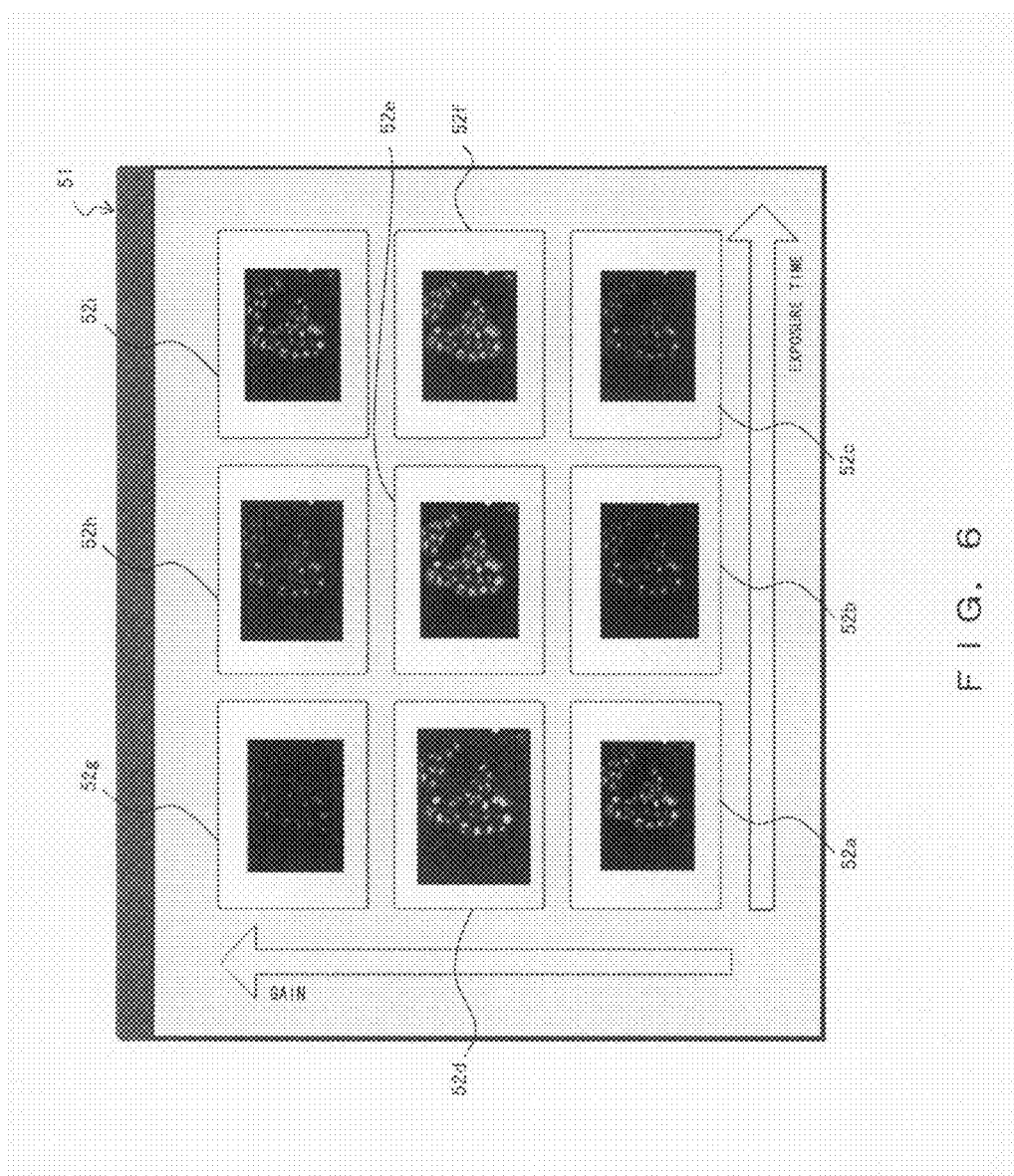
FIG. 6 is a diagram exemplifying a window having a GUI function displayed in a monitor in a parameter adjustment process according to a preferred embodiment 2.

FIG. 6 is a diagram exemplifying a window having a GUI function displayed in the monitor 5 in a parameter adjustment process according to the present embodiment. Note that the window is configured to make both parameters of an exposure time and of a gain adjustable.

The window 51 is furnished with nine simulated process image display image pickup buttons 52a, 52b through 52h and 52i (generically noted as "simulated process image display image pickup button 52" as appropriate hereinafter) for displaying nine images of a result of applying an image process to the pre-pickup image (i.e., the image picked up in the S6 of FIG. 2) based on different parameters of exposure time and gains, that is, the nine images of a result of reflecting the different parameters of exposure time and gains to the aforementioned pre-pickup image as shown in FIG. 6. The images respectively displayed on the nine simulated process image display image pickup buttons 52 are arranged so as to place, from the left to right, images of a result of being applied by image processes based on parameters for longer exposure time and, from the bottom to top, images of a result of being applied by image processing based on parameters for higher gains, with the horizontal axis showing exposure time and the vertical axis showing gain as indicated by the arrows in the drawing. Therefore, the image displayed on the simulated process image display image pickup button 52a for example is an image of a result of applying an image process based on the parameter of the shortest exposure time and the parameter of the lowest gain, and, comparably, the image displayed on the simulated process image display image pickup button 52i is an image of a result of applying an image process based on the parameter of the longest exposure time and the parameter of the highest gain.

When a simulated process image display image pickup button 52 on which a desired image is displayed is pressed by the operator using a mouse or such from among the nine simulated process image display image pickup buttons 52 as described above, an image displayed on the pressed simulated process image display image pickup button 52 is selected and a setup of the observation state of the microscope apparatus 1 and/or that of the image pickup condition of the digital camera 3 is controlled on the basis of the parameters of the exposure time and gain used for the image process of the selected image so as to pick up an image of the same image quality as, or better than, that of the selected image. In the case of the present example, the host system 2 controls to set the exposure time and gain of the digital camera 3 by way of the camera controller 31. Then the incident light shutter 16 is opened and a proper image pickup is performed.

As such, the microscope image pickup system according to the present embodiment is configured to enable an adjustment of the parameters of exposure time and gain easily, and a pickup of a desired image, without causing damage to the observation body 19 due to an illumination of light as in the case of the embodiment 1. It is also configured to display a list of a plurality of images of a result of applying image processes by combining parameters of different exposure time and gains, thereby enabling an improvement of a visibility in terms of operation, a shortening of work time and an improvement of operability, and thus greatly reducing a load on the operator.

Note that the present embodiment has been described by exemplifying the exposure time and gain as the combining parameters; they may be arbitrary, however, provided that such parameters are control items of the microscope apparatus 1 and digital camera 3. Also arbitrary is the number of combining parameters in lieu of being limited to two. Furthermore, arbitrary is the total number of images, in lieu of being limited to nine.

Meanwhile, the present embodiment is configured to display an image(s) of a result of applying an image process (es) on the simulated process image display image pickup button 52, the form or layout is arbitrary provided that a plurality of images of a result of applying an image process by combining a plurality of parameters for improving operability of adjustments can be displayed.

Here, the description is on another example of displaying a plurality of images of a result of applying image processes by combining a plurality of parameters.

Figure 7:
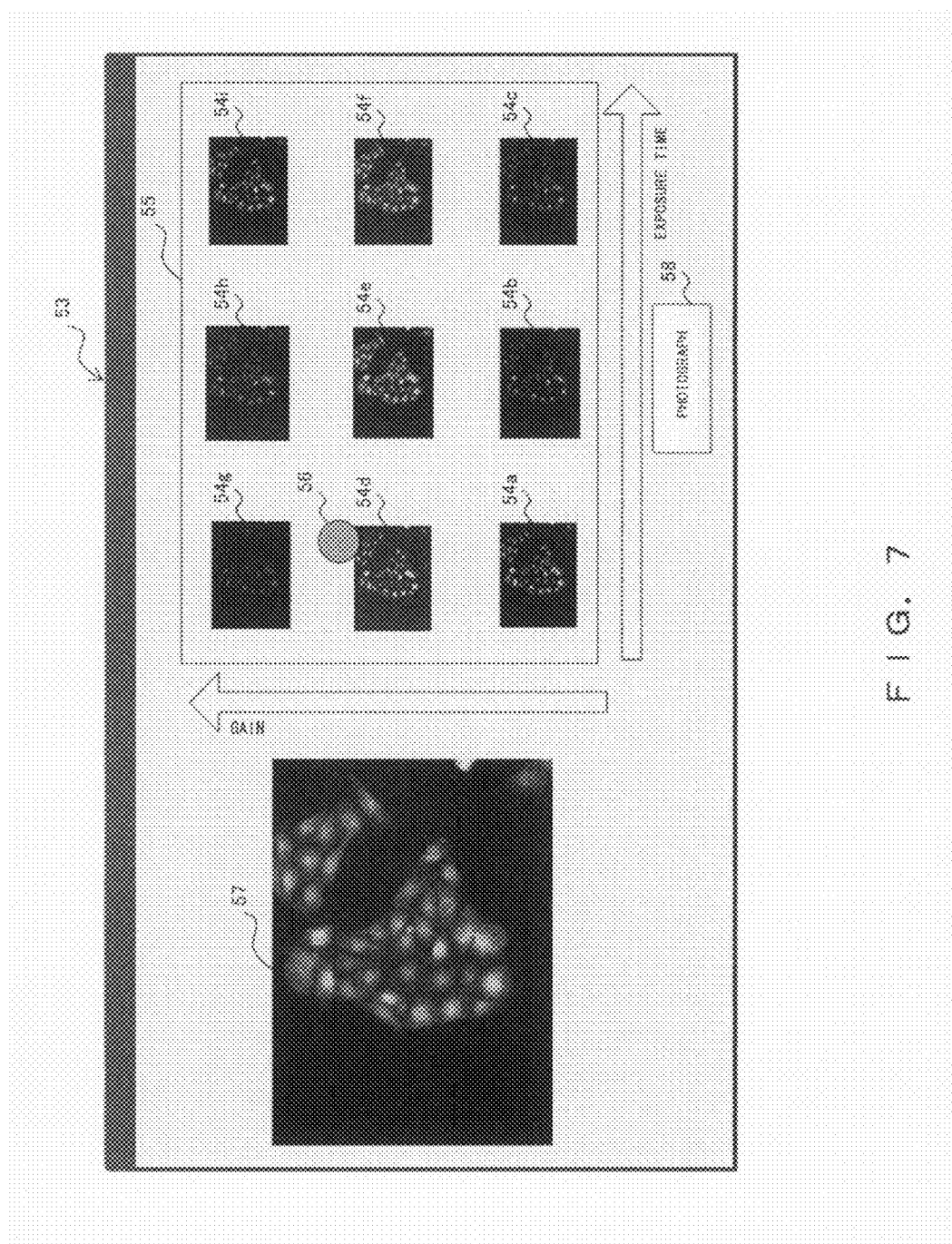
FIG. 7 is a diagram exemplifying another window having a GUI function which is displayed in a monitor in a parameter adjustment process according to the embodiment 2.

FIG. 7 is a diagram exemplifying another window having a GUI function which is displayed in a monitor 5 in a parameter adjustment process according to the present embodiment. Note that the window is also configured to enable an adjustment of parameters of exposure time and gain.

As shown in FIG. 7, the window 53 is furnished with a first simulated process image display column 55 for displaying nine images 54a, 54b through 54h and 54i (generically noted as "image 54" as appropriate hereinafter) of a result of applying an image process to the pre-pickup image (i.e., the image picked up in the S6 of FIG. 2) based on different parameters of exposure time and gains, that is, the nine images 54 of a result of reflecting the different parameters of exposure time and gains to the pre-pickup image, in a coordinate system with the horizontal axis being in terms of exposure time and with the vertical axis being in terms of gain as indicated by the respective arrows in the drawing. The nine images 54 displayed in the first simulated process image display column 55 are arranged so as to place, from the left to right of FIG. 7, images of a result of being applied by image processes based on parameters for longer exposure time and, from the bottom to top of FIG. 7, images of a result of being applied by image processing based on parameters for higher gains, in accordance with the display position on the coordinate system of the exposure time and gain, as in the case of the window 51 shown in FIG. 6. Also, the first simulated process image display column 55 displays a marker 56 allowing a movement by using a mouse or key board.

The window 53 is also additionally furnished with a second simulated process image display column 57 displaying an image of a result of applying an image process to a pre-pickup image based on parameters of the exposure time and gain corresponding to the current position of the marker 56 displayed in the first simulated process image display column 55, and a photography button 58 for starting an image pickup by controlling a setup of the observation state of the microscope apparatus 1 and/or that of the image pickup condition of the digital camera 3 so as to pick up an image of the same image quality as, or better than, that of the image currently displayed in the second simulated process image display column 57.

The window 53 configured as described above enables the operator to not only combine nine ways of combination of parameters between the exposure time and gain related to the nine images 54 but also adjust the combination of the exposure time and gain more minutely by moving the marker 56 by approximately referring to the nine images 54 displayed in the first simulated process image display column 55. Then, a pressing of the photography button 58 just when a desired image is displayed in the second simulated process image display column 57 as a result of moving the marker 56 makes it possible to pick up an image by controlling a setup of the observation state of the microscope apparatus 1 and/or that of the image pickup condition of the digital camera 3 based on the parameters of the exposure time and gain (which are also the parameters of exposure and gain corresponding to the current position of the marker 56) which is used for an image process of the image currently displayed in the second simulated process image display column 57 so as to pick up an image of the same image quality as, or better than, the image currently displayed in the second simulated process image display column 57, thereby enabling a pickup of a desired image.

The present embodiment can also be configured to display parallelly additional information such as a presence or absence of a damage to an observation body (such as a cell) and an image quality being good or bad when displaying a plurality of images of a result of applying an image process (es) by combining a plurality of different parameters in a window displayed in the monitor 5 in the parameter adjustment process.

Here, the description is on an example of parallelly displaying additional information in a window displayed in a parameter adjustment process.

Figure 8:
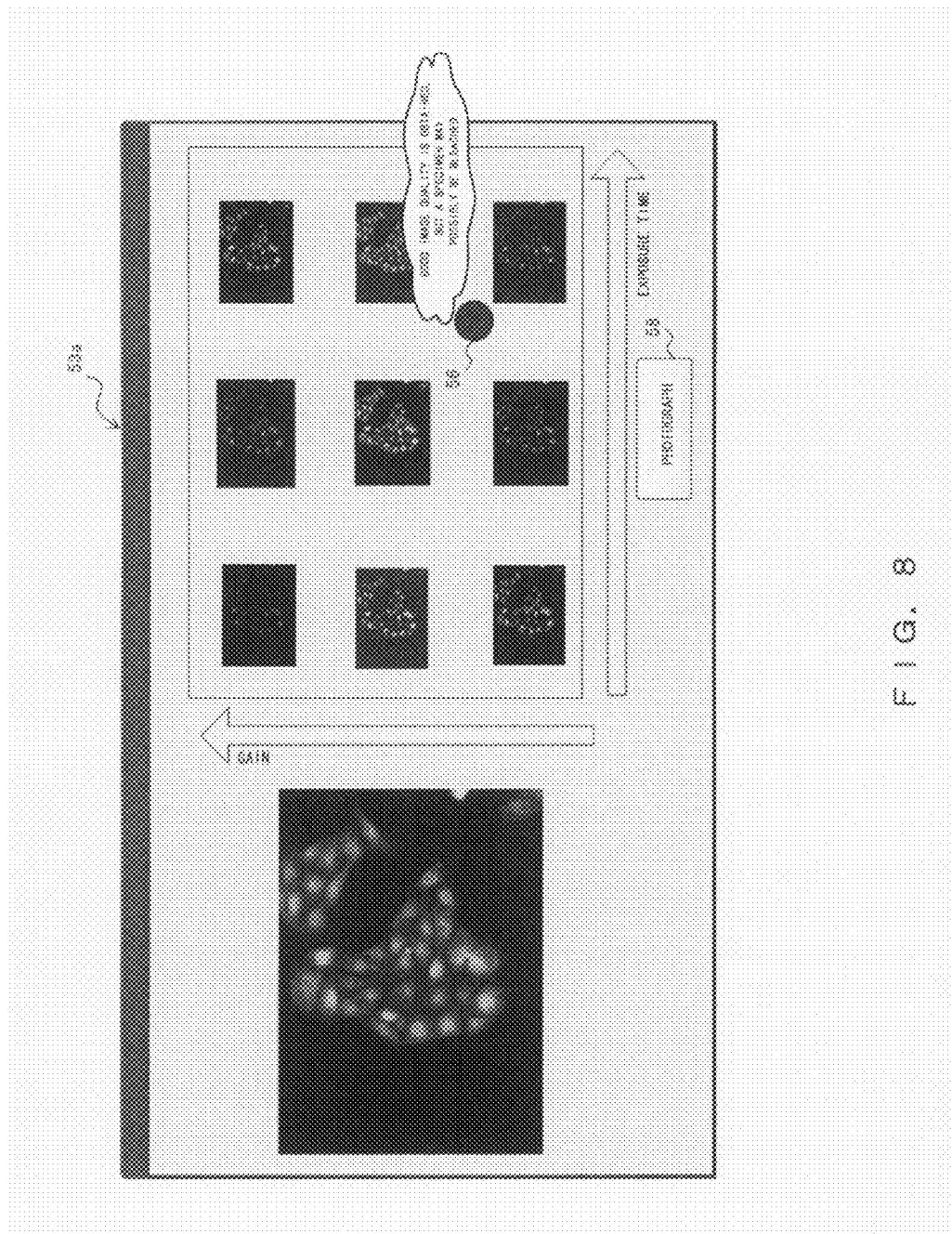
FIG. 8 is a diagram showing a first example of a window having a GUI function which is displayed in a monitor in a parameter adjustment process with an additional capability of displaying additional information according to the embodiment 2.

FIG. 8 is a diagram showing a first example of a window having a GUI function which is displayed in the monitor 5 in a parameter adjustment process with an additional capability of displaying additional information according to the present embodiment. Note that the description here is on an example of displaying additional information in the window 53 shown in FIG. 7.

The window 53a shown in FIG. 8 parallelly displays additional information related to a damage to the observation body (e.g., a cell) 19 and to an image quality of an image when picking up an image by the photography button 58 being pressed at the current position of the marker 56. In the example shown in FIG. 8, a parameter corresponding to the current position of the marker 56 is the parameter of long exposure time and a low gain, and therefore the additional information of "Good image quality is obtained, but a specimen may possibly be bleached" is parallelly displayed.

Figure 9:
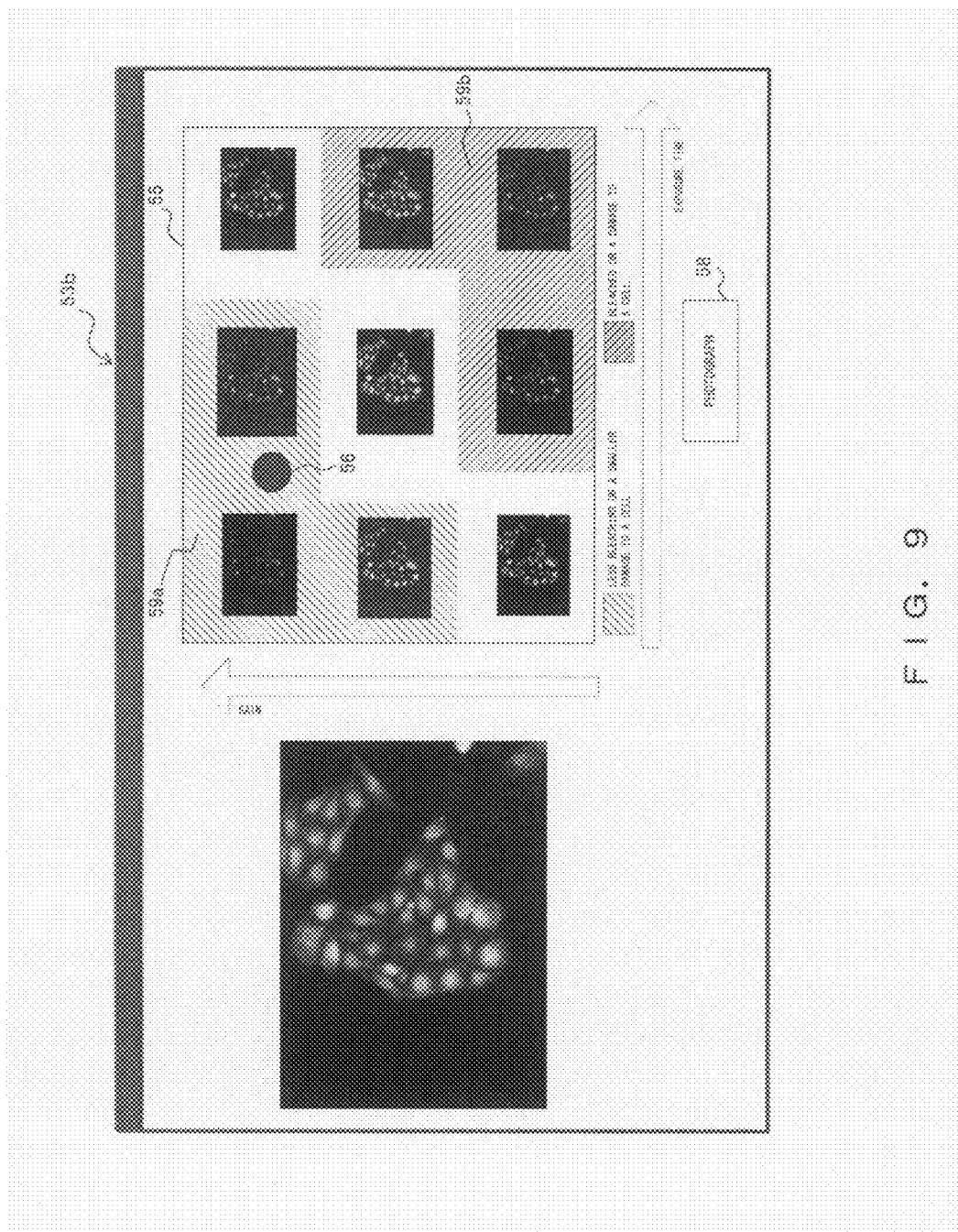
FIG. 9 is a diagram showing a second example of a window having a GUI function which is displayed in a monitor in a parameter adjustment process with an additional capability of displaying additional information according to the embodiment 2.

FIG. 9 is a diagram showing a second example of a window having a GUI function which is displayed in a monitor in a parameter adjustment process with an additional capability of displaying additional information according to the present embodiment. Note also that the description here is on an example of displaying additional information in the window 53 shown in FIG. 7.

The window 53b shown in FIG. 9 is furnished with a zone(s), which can be visually identified by the operator, in the coordinate system of exposure time and gain within the first simulated process image display column 55, and additional information related to a damage to an observation body (e.g., a cell) 19 and an image quality of an image at the time of picking up the image by the photography button 58 having been pressed when the marker 56 exists in the zone is parallelly displayed by sectioning for each zone. In the example shown in FIG. 9, a first zone 59a and a second zone 59b are furnished as zone, which can be visually identified by the operator, in the coordinate system of exposure time and gain within the first simulated process image display column 55, and also displayed is "Less bleaching or a smaller damage to a cell" as the additional information in the case of the marker 56 existing in the first zone 59a, or "Bleached or a damage to a cell" as the additional information in the case of the marker 56 existing in the second zone 59b". Note that the marker 56 exists in the first zone 59a and therefore the operator, if pressing the photography button 58 in this event, is enabled to know the fact of "Less bleaching or a smaller damage to a cell" before an actual image pickup, in the example shown in FIG. 9.

As described above, the examples described by referring to FIGS. 8 and 9 enable the operator to know the information related to a damage to the observation body 19 and an image quality of an image when picking up image by combining parameters corresponding to the current position of the marker 56 before an actual image pickup.

As such, the microscope image pickup systems according to the individual embodiments described for the first and second embodiments are configured to adopt an upright microscope apparatus as the microscope apparatus 1; an inverted microscope apparatus can be adopted instead, however.

Also, the configuration and/or operation of the microscope image pickup system described for the embodiment 1 can be combined with the configuration and/or operation of the microscope image pickup system described for the embodiment 2.

While the present invention has been described in detail so far, the present invention can apparently be improved and modified in various manners possible within the scope thereof, in lieu of being limited by the embodiment described above.

As described above, the present invention is contrived to enable an application of an image process to a picked-up image as an image picked up by adjusting a control item(s) which is(are) an observation state and/or image pickup condition, such as a gain, brightness, exposure time, aperture stop, magnification, for actually operating a microscope image pickup system. Also enabled is a creation of an image by applying such an image process as if the image were picked up by controlling a microscope image pickup system a 1a simulation, and therefore an operator is enabled to adjust the control item(s) until the completion of setting a complicated control item(s) without illuminating an observation body and pick up a desired image without causing a damage to the observation body as a result of picking up image by controlling to set an internal control item(s) for the microscope image pickup system so as to be able to pick up an image of the same image quality as, or better than, that of the image to which the image process has been applied.

Also provided is a capability to display a list of a plurality of images to which an image process has been applied by combining a plurality of control items, thereby making it possible to enable the operator to comprehend the function of control item(s) and the setup for picking up a desired image visually, thus shortening a work time, improving operability and reducing a load on the operator in great deal.

What is claimed is:

1. A microscope image pickup system having a microscope apparatus enabled to change an observation state by driving one or more optical members, comprising:
    an image pickup unit for picking up an image of an observation object;
    an image process unit for applying an image process to an image picked up by the image pickup unit;
    an input unit for inputting a process factor of the image process unit;
    a display unit for displaying an image to which an image process is applied by the image process unit based on the process factor input from the input unit;
    an observation state detection/setup unit for detecting and setting an observation state of the microscope apparatus; and
    an image pickup condition detection/setup unit for detecting and setting an image pickup condition of the image pickup unit, wherein
    an observation state of the microscope apparatus and/or an image pickup condition of the image pickup unit are set up and an image is picked up so as to pick up an image of an image quality being equal to, or better than, that of an image to which an image process is applied on the basis of the process factor input from the input unit.

2. The microscope image pickup system according to claim 1, wherein
    the process factor is equivalent to a control item of the microscope apparatus and/or that of the image pickup unit.

3. The microscope image pickup system according to claim 1, wherein
    the image process unit applies an image process by using a plurality of the process factors.

4. The microscope image pickup system according to claim 2, wherein
    the image process unit applies an image process by using a plurality of the process factors.

5. The microscope image pickup system according to claim 1, wherein
    the process factor includes either information of a stage, aperture stop, exposure time, gain, magnification, brightness, binning, objective lens, cube unit, light source voltage, ISO sensitivity, color temperature, optical filter.

6. The microscope image pickup system according to claim 2, wherein
    the process factor includes either information of a stage, aperture stop, exposure time, gain, magnification, brightness, binning, objective lens, cube unit, light source voltage, ISO sensitivity, color temperature, or optical filter.

7. The microscope image pickup system according to claim 3, wherein
    the process factor includes either information of a stage, aperture stop, exposure time, gain, magnification, brightness, binning, objective lens, cube unit, light source voltage, ISO sensitivity, color temperature, or optical filter.

8. The microscope image pickup system according to claim 4, wherein
    the process factor includes either information of a stage, aperture stop, exposure time, gain, magnification, brightness, binning, objective lens, cube unit, light source voltage, ISO sensitivity, color temperature, or optical filter.

9. The microscope image pickup system according to claim 1, further comprising
    an image selection unit for selecting an image from among a plurality of images which is displayed in the display unit and to which an image process is applied by the image process unit, wherein
    an observation state of the microscope apparatus and/or an image pickup condition of the image pickup unit are set up and an image is picked up so as to pick up an image of an image quality being equal to, or better than, that of an image selected by the image selection unit.

10. The microscope image pickup system according to claim 2, further comprising
    an image selection unit for selecting an image from among a plurality of images which is displayed in the display unit and to which an image process is applied by the image process unit, wherein
    an observation state of the microscope apparatus and/or an image pickup condition of the image pickup unit are set up and an image is picked up so as to pick up an image of an image quality being equal to, or better than, that of an image selected by the image selection unit.

11. The microscope image pickup system according to claim 3, further comprising
    an image selection unit for selecting an image from among a plurality of images which is displayed in the display unit and to which an image process is applied by the image process unit, wherein
    an observation state of the microscope apparatus and/or an image pickup condition of the image pickup unit are set up and an image is picked up so as to pick up an image of an image quality being equal to, or better than, that of an image selected by the image selection unit.

12. The microscope image pickup system according to claim 4, further comprising
    an image selection unit for selecting an image from among a plurality of images which is displayed in the display unit and to which an image process is applied by the image process unit, wherein an observation state of the microscope apparatus and/or an image pickup condition of the image pickup unit are set up and an image is picked up so as to pick up an image of an image quality being equal to, or better than, that of an image selected by the image selection unit.

13. The microscope image pickup system according to claim 5, further comprising an image selection unit for selecting an image from among a plurality of images which is displayed in the display unit and to which an image process is applied by the image process unit, wherein an observation state of the microscope apparatus and/or an image pickup condition of the image pickup unit are set up and an image is picked up so as to pick up an image of an image quality being equal to, or better than, that of an image selected by the image selection unit.

14. The microscope image pickup system according to claim 6, further comprising an image selection unit for selecting an image from among a plurality of images which is displayed in the display unit and to which an image process is applied by the image process unit, wherein an observation state of the microscope apparatus and/or an image pickup condition of the image pickup unit are set up and an image is picked up so as to pick up an image of an image quality being equal to, or better than, that of an image selected by the image selection unit.

15. The microscope image pickup system according to claim 7, further comprising an image selection unit for selecting an image from among a plurality of images which is displayed in the display unit and to which an image process is applied by the image process unit, wherein an observation state of the microscope apparatus and/or an image pickup condition of the image pickup unit are set up and an image is picked up so as to pick up an image of an image quality being equal to, or better than, that of an image selected by the image selection unit.

16. The microscope image pickup system according to claim 8, further comprising an image selection unit for selecting an image from among a plurality of images which is displayed in the display unit and to which an image process is applied by the image process unit, wherein an observation state of the microscope apparatus and/or an image pickup condition of the image pickup unit are set up and an image is picked up so as to pick up an image of an image quality being equal to, or better than, that of an image selected by the image selection unit.

17. A microscope image pickup method applied to a microscope image pickup system comprising:

a microscope apparatus having a shutter unit for controlling an emission of an illumination light from a light source onto an observation specimen and comprising a drive unit capable of remotely operating each unit;

an image pickup unit attached to the microscope apparatus;

an image recording unit;

an image display unit;

an image process unit;

an input unit for inputting a process factor of the image process unit; and a control unit connected to the microscope apparatus, wherein the process comprises opening the shutter unit and also pre-picking up image of the observation specimen at an initial setup, closing the shutter unit and also recording the pre-picked up image in the image recording unit, initiating an image process and also determining a process factor which is an image pickup condition for obtaining a desired image, while displaying a pre-picked up image in the image display unit, re-setting up the image pickup unit and microscope apparatus based on the determined process factor, opening the shutter unit and also properly picking up image of the observation specimen, and closing the shutter unit and also recording the properly picked-up image in the image recording unit.

18. The microscope image pickup method according to claim 17, wherein the process factor of the image process unit includes either information of a stage, aperture stop, exposure time, gain, magnification, brightness, binning, objective lens, cube unit, light source voltage, ISO sensitivity, color temperature, or optical filter.

19. The microscope image pickup method according to claim 17, wherein the image display unit comprises a graphical user interface (GUI) constituted by an image display unit and by an input unit.

20. A computer readable recording medium recording a control program for making a computer execute a microscope image pickup method applied to a microscope image pickup system comprising:

a microscope apparatus having a shutter unit for controlling an emission of an illumination light from a light source onto an observation specimen and comprising a drive unit capable of remotely operating each unit;

an image pickup unit attached to the microscope apparatus;

an image recording unit;

an image display unit an image process unit;

an input unit for inputting a process factor of the image process unit; and a control unit connected to the microscope apparatus, wherein the microscope image pickup process comprises opening the shutter unit and also pre-picking up image of the observation specimen at an initial setup, closing the shutter unit and also recording the pre-picked up image in the image recording unit, initiating an image process and also determining a process factor which is an image pickup condition for obtaining a desired image, while displaying a pre-picked up image in the image display unit, re-setting up the image pickup unit and microscope apparatus based on the determined process factor, opening the shutter unit and also properly picking up image of the observation specimen, and closing the shutter unit and also recording the properly picked-up image in the image recording unit.

* * * * *